(12) United States Patent
Ide

(10) Patent No.: US 10,494,022 B2
(45) Date of Patent: Dec. 3, 2019

(54) DRIVING ASSISTANCE DEVICE

(71) Applicant: TOYOTA JIDOSHA KABUSHIKI KAISHA, Toyota-shi, Aichi-ken (JP)

(72) Inventor: Hirohito Ide, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 180 days.

(21) Appl. No.: 15/843,594

(22) Filed: Dec. 15, 2017

(65) Prior Publication Data

US 2018/0178839 A1 Jun. 28, 2018

(30) Foreign Application Priority Data

Dec. 27, 2016 (JP) .................................. 2016-253247

(51) Int. Cl.
B62D 15/02 (2006.01)
B62D 6/00 (2006.01)

(52) U.S. Cl.
CPC ........... B62D 15/025 (2013.01); B62D 6/002 (2013.01); B62D 15/029 (2013.01)

(58) Field of Classification Search
CPC ..... B62D 15/025; B62D 6/002; B62D 15/029
See application file for complete search history.

(56) References Cited

U.S. PATENT DOCUMENTS

| | | | | |
|---|---|---|---|---|
| 8,630,793 B2* | 1/2014 | Takemura | ............. | B60W 30/12 701/1 |
| 9,550,494 B2* | 1/2017 | Aso | ....................... | B60W 30/12 |
| 10,163,352 B2* | 12/2018 | Fujii | ....................... | G08G 1/167 |
| 2004/0230375 A1* | 11/2004 | Matsumoto | ......... | B60T 8/17557 701/301 |
| 2005/0107931 A1* | 5/2005 | Shimakage | .......... | B62D 15/025 701/41 |
| 2005/0270145 A1* | 12/2005 | Kataoka | ................ | B60W 30/12 340/435 |
| 2006/0025918 A1 | 2/2006 | Saeki | | |
| 2008/0082261 A1* | 4/2008 | Tengler | .................. | G01C 21/26 701/414 |
| 2010/0324797 A1* | 12/2010 | Fritz | ..................... | B60W 10/06 701/96 |

(Continued)

FOREIGN PATENT DOCUMENTS

| JP | 2003-026028 A | 1/2003 |
|---|---|---|
| JP | 2006-315491 A | 11/2006 |

(Continued)

*Primary Examiner* — Calvin Cheung
(74) *Attorney, Agent, or Firm* — Sughrue Mion, PLLC

(57) ABSTRACT

A driving assistance device includes an ECU configured to make a warning unit issue the warning to a driver, when a first condition and a second condition are both satisfied. The first condition is a condition that there is a possibility that the host vehicle deviates from a deviation-side traveling lane edge specified by one of right and left lane division lines when LKA is executed. The second condition is a condition that behavior of the host vehicle approaching the deviation-side traveling lane edge occurs at the current position of the host vehicle at at least one point of time of a first point of time at which determination is made that the first condition is satisfied and a third point of time in a period from the first point of time to a second point of time after a predetermined time elapses.

7 Claims, 5 Drawing Sheets

(56) References Cited

U.S. PATENT DOCUMENTS

| | | |
|---|---|---|
| 2012/0314055 A1 | 12/2012 | Kataoka |
| 2015/0274164 A1 | 10/2015 | Terazawa et al. |
| 2016/0288707 A1 | 10/2016 | Matsumura |
| 2016/0288790 A1* | 10/2016 | Aoki .................... B60W 30/165 |
| 2018/0134289 A1* | 5/2018 | Kokido .................... B62D 6/00 |

FOREIGN PATENT DOCUMENTS

| | | |
|---|---|---|
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2010-006279 A | 1/2010 |
| JP | 4929777 B2 | 5/2012 |
| JP | 2014-148293 A | 8/2014 |
| JP | 2015-189411 A | 11/2015 |
| JP | 2016-193683 A | 11/2016 |
| WO | 2012/169029 A1 | 12/2012 |

* cited by examiner

DRIVING ASSISTANCE DEVICE

INCORPORATION BY REFERENCE

The disclosure of Japanese Patent Application No. 2016-253247 filed on Dec. 27, 2016 including the specification, drawings and abstract is incorporated herein by reference in its entirety.

BACKGROUND

1. Technical Field

The present disclosure relates to a driving assistance device that, in a case where a control allowable range allowed in lane keeping assistance control is predicted to be exceeded during execution of the lane keeping assistance control for assisting traveling of a vehicle (host vehicle) near a lane center, issues a warning to this effect.

2. Description of Related Art

In the related art, a driving assistance device that recognizes a lane division line, such as a white line or a yellow line, of a road using a camera mounted in a host vehicle and controls steering assistance torque such that the host vehicle travels at an appropriate position within a "traveling lane specified by the recognized lane division line" is known. As typical control that is executed by such a driving assistance device, lane keeping assistance control is known.

In a case of executing the lane keeping assistance control, for example, the driving assistance device detects right and left white lines of a road with a camera sensor and sets a central line to be a central position of the right and left white lines as a target traveling line (target traveling path). In addition, the driving assistance device assists a steering operation of a driver by giving steering assistance torque to a steering mechanism such that a traveling position of the host vehicle is maintained near the target traveling line.

In an example of the driving assistance device in the related art (referred to as a "related art device"), in a case of executing the lane keeping assistance control, steering control is performed within a steering control range (steering control limit). In addition, when a situation occurs in which the host vehicle can be predicted to deviate from the traveling lane in a case where the lane keeping assistance control is performed such that the steering control range is not exceeded during the execution of the lane keeping assistance control, the related art device estimates (calculates) a time (referred to as a "deviation prediction time") until the host vehicle deviates from the traveling lane based on a traveling state, a position, and a direction of the host vehicle with respect to the traveling lane. Then, the related art device determines whether or not there is a need for issuing a warning based on the estimated deviation prediction time and other parameters and issues a warning to the driver when determination is made that there is a need for issuing a warning (for example, Japanese Unexamined Patent Application Publication No. 2016-193683 (JP 2016-193683 A).

SUMMARY

In order to calculate the "deviation prediction time", the related art device needs to acquire a traveling lane shape (for example, a curvature) at a position in front of and far from the host vehicle and a position of a traveling lane edge from a current position of the host vehicle.

Meanwhile, in a case where a situation in which a white line is blurred, a situation in which accuracy of white line recognition is degraded due to the influence of a surrounding environment, or the like occurs, it may be difficult to acquire an accurate position of the traveling lane edge in front of and far from the host vehicle. In a case where such a situation occurs, accuracy of a prediction time until the vehicle deviates from the traveling lane is degraded. As a result, since a frequency in which an erroneous warning is issued increases, there is a possibility that a driver may feel troublesomeness with the warning.

The present disclosure provides a driving assistance device that issues, to a driver, a warning that there is a possibility that a vehicle may deviate from a traveling lane in a case where lane keeping assistance control is continued within a control allowable range during execution of the lane keeping assistance control, having an advantage of reducing a possibility that an erroneous warning may be issued. Hereinafter, a driving assistance device according to an aspect of the present disclosure is referred to as a "present disclosure device".

An aspect of the present disclosure relates to a driving assistance device. The driving assistance device includes a warning unit configured to issue a warning to a driver of a host vehicle, and an electronic control unit. The electronic control unit is configured to acquire information in front of the host vehicle relating to a traveling lane, on which the host vehicle is traveling, determine a target traveling line based on the acquired information, acquire a driving state parameter of the host vehicle that changes according to at least one of a steering angle and a temporal change rate of the steering angle, execute lane keeping assistance control for changing a steering angle of the host vehicle such that the host vehicle travels along the target traveling line, and make the warning unit issue the warning. The electronic control unit is configured to control the steering angle such that the magnitude of the driving state parameter that occurs through the lane keeping assistance control does not exceed a predetermined allowable limit value.

The electronic control unit is configured to make the warning unit issue the warning in a case where the electronic control unit determines that a first condition is satisfied when the electronic control unit determines that a second condition is satisfied. The first condition is a condition that there is a possibility that the host vehicle deviates from a deviation-side traveling lane edge specified by one of right and left lane division lines defining the traveling lane due to the magnitude of the driving state parameter exceeding the allowable limit value when the lane keeping assistance control is executed along the target traveling line at a position of a predetermined distance forward from a current position of the host vehicle. The second condition is a condition that behavior of the host vehicle approaching the deviation-side traveling lane edge occurs at the current position of the host vehicle, at at least one point of time of a first point of time at which determination is made that the first condition is satisfied and a third point of time in a period from the first point of time to a second point of time after a predetermined time elapses.

In a case where determination is made that the first condition is satisfied that the magnitude of the driving state parameter exceeds the allowable limit value in a case where it is assumed that the lane keeping assistance control is executed along the target traveling line at the position forward of the host vehicle, in other words, there is a possibility that the host vehicle may deviate from the deviation-side traveling lane edge in a case where the lane keeping assistance control is executed within the range of the control allowable limit, the electronic control unit can make a warning be issued.

However, for example, in a case where the lane division line (for example, white line) is thinned at the position forward of the host vehicle, the target traveling line determined based on the lane division line is not necessarily accurate. For this reason, in a case where a warning is issued only when determination is made that the first condition is satisfied, there is a possibility that the warning may be an erroneous warning.

Accordingly, the electronic control unit of the present disclosure device is configured to make a warning be issued when determination is made that not only the first condition, but also the second condition is satisfied that the behavior of the host vehicle approaching the deviation-side traveling lane edge at the current position of the host vehicle occurs.

Since the deviation-side traveling lane edge is close to the host vehicle at the current position of the host vehicle, it is possible to comparatively accurately ascertain the deviation-side traveling lane edge. Accordingly, in a case where the second condition is satisfied, a probability of determination that the host vehicle tends to deviate from the traveling lane is high, and for this reason, a probability of determination that the first condition is satisfied is also high. Therefore, the present disclosure device can extremely reduce a possibility that notification may erroneously be given to a driver to the effect that there is a possibility that the lane keeping assistance control may reach the control allowable limit (there is a possibility of lane deviation).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
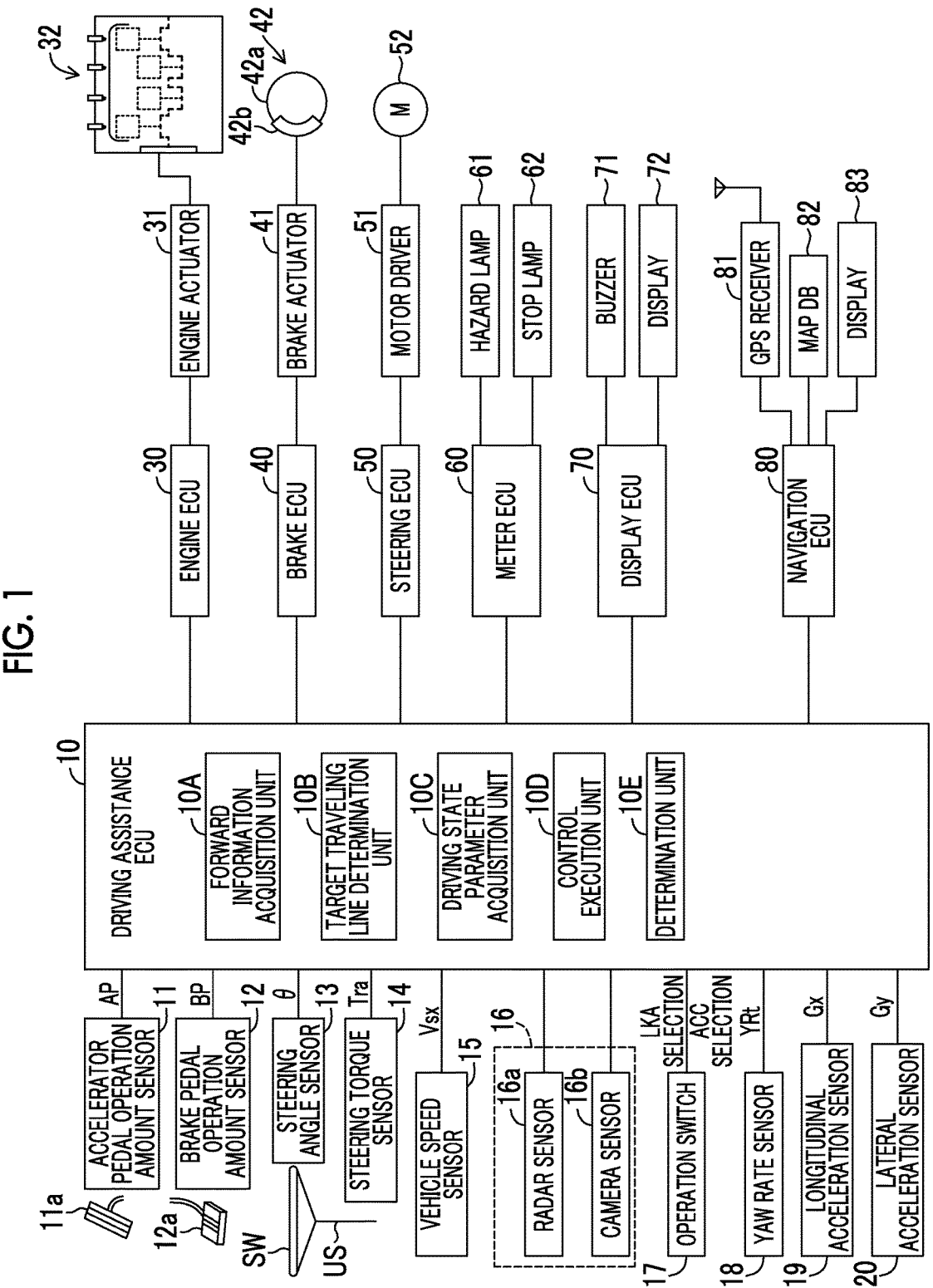
FIG. 1 is a schematic configuration diagram of a driving assistance device according to an embodiment of the present disclosure.

Hereinafter, a driving assistance device (vehicle traveling control device) according to an embodiment of the present disclosure will be described referring to the drawings.
Configuration As shown in FIG. 1, the driving assistance device (hereinafter, referred to as a "present device") according to the embodiment of the present disclosure is applied to a vehicle (hereinafter, referred to as a "host vehicle" for distinction from other vehicles), and includes a driving assistance ECU 10, an engine ECU 30, a brake ECU 40, a steering ECU 50, a meter ECU 60, a display ECU 70, and a navigation ECU 80.

The ECUs are electronic control units that include a microcomputer as a main part, and are connected to transmit and receive information with one another through a controller area network (CAN) (not shown). In the specification, a microcomputer includes a CPU, a ROM, a RAM, a non-volatile memory, an interface I/P, and the like. The CPU executes an instruction (a program or a routine) stored in the ROM to realize various functions. A few or all of the ECUs may be integrated into a single ECU.

The driving assistance ECU 10 is connected to sensors (including a switch) listed below, and receives detection signals or output signals from the sensors. The sensors may be connected to the ECUs other than the driving assistance ECU 10. In this case, the driving assistance ECU 10 receives the detection signals or the output signals of the sensors from the ECUs, to which the sensors are connected, through the CAN.

An accelerator pedal operation amount sensor 11 detects an operation amount (accelerator operation amount) of an accelerator pedal 11a of the host vehicle and outputs a signal representing an accelerator pedal operation amount AP. A brake pedal operation amount sensor 12 detects an operation amount of a brake pedal 12a of the host vehicle and outputs a signal representing a brake pedal operation amount BP.

A steering angle sensor 13 detects a steering angle of the host vehicle and outputs a signal representing a steering angle θ. A steering torque sensor 14 detects steering torque applied to a steering shaft US of the host vehicle with an operation of a steering wheel SW and outputs a signal representing steering torque Tra. A vehicle speed sensor 15 detects a traveling speed (vehicle speed) of the host vehicle and outputs a signal representing a vehicle speed Vsx. That is, the vehicle speed Vsx is a speed (longitudinal speed) in a front-rear direction of the vehicle.

A surroundings sensor 16 acquires information relating to at least a road forward of the host vehicle and a solid object on the road. A solid object represents, for example, a moving object, such as a pedestrian, a bicycle, or a vehicle, and a fixed object, such as a pole, a tree, or a guardrail. Hereinafter, the solid object may be referred to as an "object". The surroundings sensor 16 includes a radar sensor 16a and a camera sensor 16b. The surroundings sensor 16 calculates and outputs the presence or absence of an object and the relative relationship (that is, the distance between the host vehicle and an object, an azimuth of an object viewed from the host vehicle, a relative speed of the host vehicle and an object, and the like) between the host vehicle and an object.

For example, the radar sensor 16a emits an electric wave (hereinafter, referred to as a millimeter wave) in a millimeter wave band to a peripheral area of the host vehicle including at least an area forward of the host vehicle and receives a millimeter wave (that is, a reflected wave) reflected from an object within an emission range.

Specifically, the radar sensor 16a includes a processing unit. The processing unit acquires an inter-vehicle distance (longitudinal distance) Dfx(n), a relative speed Vfx(n), an azimuth H(n), and the like with respect to each detected object (n) at every lapse of a predetermined time based on the phase difference between a transmitted millimeter wave and a received reflected wave, an attenuation level of the reflected wave, a time until the reflected wave is received after the millimeter wave is transmitted, and the like.

The inter-vehicle distance Dfx(n) is the distance between the host vehicle and the object (n) (for example, a preceding vehicle) along a central axis (hereinafter, referred to as a "central axis of the host vehicle") extending in the front-rear direction of the host vehicle. The relative speed Vfx(n) is the difference (=Vt−Vsx) between a speed Vtx of the object (n) (for example, a preceding vehicle) and a speed Vsx of a host vehicle VA. The speed Vtx of the object (n) is the speed of the object (n) in a moving direction of the host vehicle. The azimuth H(n) is the angle between a straight line connecting the object (n) and a front end central portion of the host vehicle and the central axis of the host vehicle. The azimuth H(n) is determined to become a positive value when the object (n) is on the right side of the central axis of the host vehicle and to become a negative value when the object (n) is on the left side of the central axis of the host vehicle.

The camera sensor 16b includes a stereo camera and a processing unit, and images scenery in a right area and a left area in front of the vehicle to acquire a pair of right and left image data. The camera sensor 16b calculates and outputs the presence or absence of an object, the relative relationship between the host vehicle and the object, and the like based on the captured right and left image data. In this case, the driving assistance ECU 10 combines the relative relationship between the host vehicle and the object obtained by the radar sensor 16a and the relative relationship between the host vehicle and the object obtained by the camera sensor 16b, thereby determining the relative relationship between the host vehicle and the object. The camera sensor 16b recognizes a lane division line (lane marker) (hereinafter, simply referred to as a "white line"), such as right and left white lines, of a road based on the captured right and left image data, and calculates and outputs a shape (curvature R) of the road and the positional relationship (for example, the distance between a right edge or a left edge of a lane on which the host vehicle is traveling and a central position in the vehicle width direction of the host vehicle) between the road and the host vehicle based on the recognized white lines.

Information acquired by the surroundings sensor 16 is referred to as object information. The surroundings sensor 16 repeatedly transmits the object information to the driving assistance ECU 10 in a predetermined cycle. In regard to information representing the shape (curvature R) of the road on which the host vehicle travels and the positional relationship between the road and the host vehicle, information from the navigation ECU 80 may be used.

An operation switch 17 is a switch that is operated by the driver. The driver operates the operation switch 17 to select whether or not to execute adaptive cruise control (ACC). In addition, the driver operates the operation switch 17 to select whether or not to execute lane keeping assistance control (LKA or lane trace control (LTC)).

A yaw rate sensor 18 detects a yaw rate YRt of the host vehicle and outputs an actual yaw rate YRt. The actual yaw rate YRt becomes a positive value in a case where the host vehicle turns left while moving forward, and becomes a negative value in a case where the host vehicle turns right while moving forward. A longitudinal acceleration sensor 19 detects an acceleration Gx in the front-rear direction (a direction along the central axis of the host vehicle) of the host vehicle and outputs an actual longitudinal acceleration Gx. The actual longitudinal acceleration Gx becomes a positive value when the host vehicle is accelerated forward, and becomes a negative value when the host vehicle is decelerated. A lateral acceleration sensor 20 detects an acceleration Gy in a lateral (vehicle width) direction (a direction orthogonal to the central axis of the host vehicle) of the host vehicle and outputs an actual lateral acceleration Gy. The actual lateral acceleration Gy becomes a positive value in a case where the host vehicle turns left while moving forward (that is, with respect to an acceleration in a vehicle right direction), and becomes a negative value in a case where the host vehicle turns right while moving forward (that is, with respect to an acceleration in a vehicle left direction).

The driving assistance ECU 10 is configured to execute the adaptive cruise control and the lane keeping assistance control. In addition, the driving assistance ECU 10 is configured to issue a warning (alert the driver) described below in a case where the lane keeping assistance control is executed. Focusing on the functions of the driving assistance ECU 10, the driving assistance ECU 10 includes a forward information acquisition unit 10A, a target traveling line determination unit 10B, a driving state parameter acquisition unit 10C, a control execution unit 10D, and a determination unit (warning controller) 10E.

The engine ECU 30 is connected to an engine actuator 31. The engine actuator 31 is an actuator that is provided to change an operation state of an internal combustion engine 32. In the example, the internal combustion engine 32 is a gasoline fuel injection spark-ignition multi-cylinder engine, and includes a throttle valve that is provided to adjust an intake air amount. The engine actuator 31 includes at least a throttle valve actuator that changes an opening degree of the throttle valve. The engine ECU 30 drives the engine actuator 31 to change torque that is generated by the internal combustion engine 32. The torque generated by the internal combustion engine 32 is transmitted to drive wheels (not shown) through a transmission (not shown). Accordingly, the engine ECU 30 controls the engine actuator 31 to control drive power of the host vehicle and to change an acceleration state (acceleration).

The brake ECU 40 is connected to a brake actuator 41. The brake actuator 41 is provided in a hydraulic circuit between a master cylinder (not shown) that pressurizes hydraulic oil with stepping force of the brake pedal and frictional brake mechanisms 42 that are provided in right, left, front, and rear wheels. Each of the frictional brake mechanisms 42 includes a brake disk 42a that is fixed to the wheel, and a brake caliper 42b that is fixed to a vehicle body. The brake actuator 41 adjusts hydraulic pressure supplied to a wheel cylinder embedded in the brake caliper 42b according to an instruction from the brake ECU 40, and operates the wheel cylinder with the hydraulic pressure to press a brake pad to the brake disk 42a, thereby generating frictional braking force. Accordingly, the brake ECU 40 controls the brake actuator 41 to control braking force of the host vehicle.

The steering ECU 50 is a control device of a known electric power steering system, and is connected to a motor driver 51. The motor driver 51 is connected to a motor 52 for turning. The motor 52 for turning is incorporated into "a steering mechanism (not shown) including a steering wheel, a steering shaft coupled to the steering wheel, a gear mechanism for steering, and the like" of the vehicle. The motor 52 for turning generates torque with electric power supplied from the motor driver 51 and applies steering assistance torque with the torque or turns the right and left steered wheels. That is, the motor 52 for turning can change a steering angle of the host vehicle.

The meter ECU 60 is connected to a digital display type meter (not shown), and is also connected to a hazard lamp 61 and a stop lamp 62. The meter ECU 60 makes the hazard lamp 61 blink and makes the stop lamp 62 light up according to an instruction from the driving assistance ECU 10.

The display ECU 70 is connected to a buzzer 71 and a display 72. The display ECU 70 makes the buzzer 71 sound according to an instruction from the driving assistance ECU 10 to alert the driver, and makes a mark for an alert (for example, a warning lamp) light up, displays a warning image, displays a warning message, and displays an operation situation of driving assistance control on the display 72. The display 72 is a display device that displays an image according to a command of the driving assistance ECU 10. Specifically, the display 72 is a head up display, but may be other displays (for example, a multi-function display).

The navigation ECU 80 is connected to a GPS receiver 81 that receives GPS signals for detecting a current position of the host vehicle, a map database 82 that stores map information or the like, a touch panel type display 83 that is a human-machine interface, and the like. The navigation ECU 80 specifies a position (in a case where the host vehicle is traveling on a road having a plurality of lanes, information for specifying a lane on which the host vehicle is traveling is included) of the host vehicle at the present time based on the GPS signals. The navigation ECU 80 performs various kinds of calculation processing based on the position of the host vehicle, the map information stored in the map database 82, and the like, and performs route guidance using the display 83.

The map information stored in the map database 82 includes road information. The road information includes a radius of curvature or a curvature of a road indicating the degree of curve of the road. The curvature is a reciprocal of the radius of curvature.

Outline of Operation

Next, the outline of operation of the present device will be described. The driving assistance ECU 10 of the present device performs the above-described lane deviation prediction determination in a case where the lane keeping assistance control (LKA) and the adaptive cruise control (ACC) are executed, and issues a warning (in the example, alerts a driver with change in a display form on the display 72) of the driver based on the determination result.

Hereinafter, the outline of processing for issuing a warning based on the lane deviation prediction determination and the determination result will be described. First, "the adaptive cruise control and the lane keeping assistance control" that are requested to be executed as a condition for performing the lane deviation prediction determination will be described.

Adaptive Cruise Control (ACC)

The adaptive cruise control is control for making the host vehicle follow a preceding vehicle based on the object information while maintaining the inter-vehicle distance between the preceding vehicle traveling immediately in front of the host vehicle and the host vehicle to a predetermined distance. The adaptive cruise control itself is known (for example, see Japanese Unexamined Patent Application Publication No. 2014-148293 (JP 2014-148293 A), Japanese Unexamined Patent Application Publication No. 2006-315491 (JP 2006-315491 A), Japanese Patent No. 4172434 (JP 4172434 B), and Japanese Patent No. 4929777 (JP 4929777 B), or the like). Accordingly, hereinafter, simple description will be provided.

The driving assistance ECU 10 executes the adaptive cruise control in a case where the adaptive cruise control is requested with an operation of the operation switch 17.

Specifically, in a case where the adaptive cruise control is requested, the driving assistance ECU 10 selects a following target vehicle based on the object information acquired by the surroundings sensor 16. For example, the driving assistance ECU 10 determines whether or not the relative position of the object (n) specified from the azimuth H(n) of the detected object (n) and the inter-vehicle distance Dfx(n) is present within a prescribed following target vehicle area such that the longer the inter-vehicle distance, the smaller an absolute value of the azimuth H(n). Then, the relative position of the object is present within the following target vehicle area over a predetermined time or more, the object (n) is selected as a following target vehicle.

In addition, the driving assistance ECU 10 calculates a target acceleration Gtgt according to one of Expressions (1) and (2) described below. In Expressions (1) and (2), Vfx(a) is a relative speed of a following target vehicle (a), k1 and k2 are predetermined positive gains (coefficients), and ΔD1 is an inter-vehicle deviation (=Dfx(a)−Dtgt) obtained by subtracting "a target inter-vehicle distance Dtgt from an inter-vehicle distance Dfx(a) of the following target vehicle (a). The target inter-vehicle distance Dtgt is calculated by multiplying a target inter-vehicle time Ttgt set by the driver using the operation switch 17 by the vehicle speed Vsx of the host vehicle (that is, Dtgt=Ttgt·Vsx).

The driving assistance ECU 10 determines the target acceleration Gtgt using Expression (1) described below in a case where a value (k1·ΔD1+k2·Vfx(a)) is positive or "0". ka1 is a positive gain (coefficient) for acceleration and is set to a value equal to or less than "1". The driving assistance ECU 10 determines the target acceleration Gtgt using Expression (2) described below in a case where the value (k1·ΔD1+k2·Vfx(a)) is negative. kd1 is a positive gain (coefficient) for deceleration and is set to "1" in the example.

$$Gtgt(\text{for acceleration})=ka1\cdot(k1\cdot\Delta D1+k2\cdot Vfx(a)) \quad (1)$$

$$Gtgt(\text{for deceleration})=kd1\cdot(k1\cdot\Delta D1+k2\cdot Vfx(a)) \quad (2)$$

In a case where an object is not present within the following target vehicle area, the driving assistance ECU 10 determines the target acceleration Gtgt based on a target speed and the vehicle speed Vsx such that the vehicle speed Vsx of the host vehicle coincides with "the target speed set according to the target inter-vehicle time Ttgt".

The driving assistance ECU 10 controls the engine actuator 31 using the engine ECU 30 and, as needed, controls the brake actuator 41 using the brake ECU 40 such that the actual longitudinal acceleration Gx coincides with the target acceleration Gtgt.

Lane Keeping Assistance Control (LKA)

The lane keeping assistance control is control for giving the steering torque to the steering mechanism to change the steering angle of the host vehicle, and thus, assisting the steering operation of the driver such that the position of the host vehicle is maintained near the target traveling line within "the lane (traveling lane) on which the host vehicle is traveling". The lane keeping assistance control itself is known (for example, Japanese Unexamined Patent Application Publication No. 2008-195402 (JP 2008-195402 A), Japanese Unexamined Patent Application Publication No. 2009-190464 (JP 2009-190464 A), Japanese Unexamined Patent Application Publication No. 2010-6279 (JP 2010-6279 A), Japanese Patent No. 4349210 (JP 4349210 B), or the like). Accordingly, hereinafter, simple description will be provided.

Figure 2:
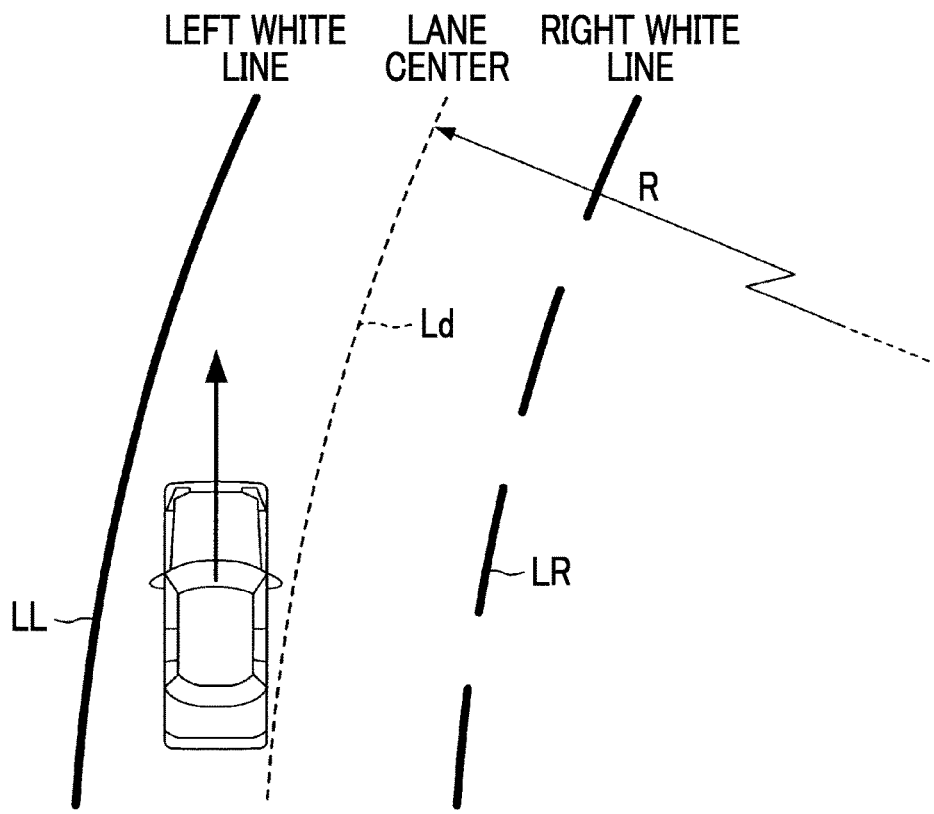
FIG. 2 is a plan view showing a left white line, a right white line, a target traveling line, and a curve radius.

In a case where the lane keeping assistance control is requested with an operation of the operation switch 17 during the execution of the adaptive cruise control, the driving assistance ECU 10 executes the lane keeping assistance control. Specifically, as shown in FIG. 2, in a case where the lane keeping assistance control is requested during the execution of the adaptive cruise control, the driving assistance ECU 10 recognizes (acquires) "a left white line LL and a right white line LR" of a lane (that is, traveling lane) on which the host vehicle is traveling based on information transmitted from the camera sensor 16b with the forward information acquisition unit 10A. That is, the forward information acquisition unit 10A acquires information forward of the host vehicle relating to the traveling lane on which the host vehicle is traveling. Furthermore, the driving assistance ECU 10 determines a central position of the white lines as a target traveling line Ld with the target traveling line determination unit 10B. In addition, the driving assistance ECU 10 calculates a curvature v (a reciprocal of a curve radius R) of the target traveling line Ld and the position and direction of the host vehicle on the traveling lane divided by the left white line LL and the right white line LR.

Figure 3:
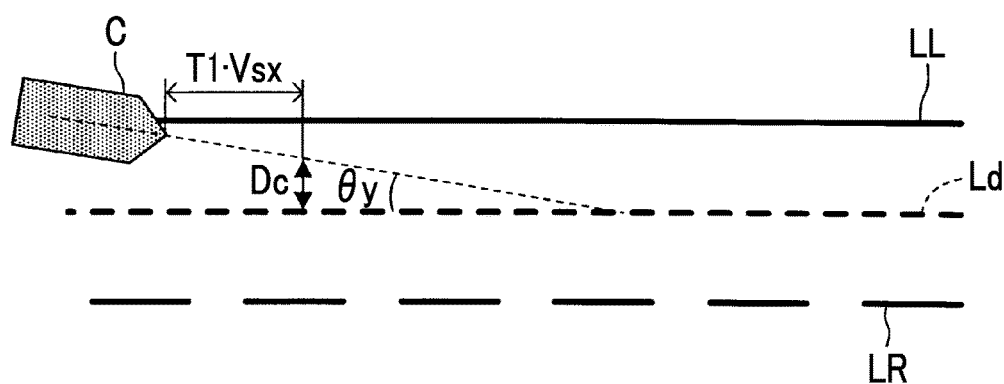
FIG. 3 is a plan view illustrating lane keeping assistance control.

As shown in FIG. 3, the driving assistance ECU 10 calculates and acquires a center distance Dc and a yaw angle θy. The center distance Dc is the distance Dc in a road width direction between a current front end central position of a host vehicle C and a point (that is, a point on the target traveling line Ld ahead of the current front end central position of the host vehicle C by a distance T1·Vsx in a lane direction) on the target traveling line Ld in a case where it is assumed that the host vehicle travels at the current vehicle speed Vsx for a predetermined time (preview time) T1. The yaw angle θy is a deviation angle θy between a direction of the target traveling line Ld and a moving direction of the host vehicle C. The predetermined time T1 may be "0", but may be set to a value before and after one second.

The driving assistance ECU 10 calculates a target yaw rate YRc* in a predetermined calculation cycle based on the center distance Dc, the yaw angle θy, and the curvature v of the target traveling line Ld by Expression (3) described below. In Expression (3), K1, K2, and K3 are control gains. The target yaw rate YRc* is a yaw rate that is set such that the host vehicle can travel along the target traveling line Ld.

$$YRc^* = K1 \times Dc + K2 \times \theta y + K3 \times v \quad (3)$$

The driving assistance ECU 10 calculates target steering torque Tr* in a predetermined calculation cycle for obtaining the target yaw rate YRc* based on the target yaw rate YRc* and the actual yaw rate YRt with the control execution unit 10D. Specifically, the driving assistance ECU 10 stores a look-up table, in which the relationship of the deviation between the target yaw rate YRc* and the actual yaw rate YRt and the target steering torque Tr* is defined, in advance, and applies the deviation between the target yaw rate YRc* and the actual yaw rate YRt to the table to calculate the target steering torque Tr*. Then, the driving assistance ECU 10 controls the motor 52 for turning using the steering ECU 50 with the control execution unit 10D such that actual steering torque Tra coincides with the target steering torque Tr*. In this way, the driving assistance ECU 10 executes the lane keeping assistance control for controlling the steering angle of the host vehicle such that the host vehicle travels along the target traveling line Ld.

Meanwhile, during the execution of the lane keeping assistance control, a lateral acceleration and a yaw rate change rate (yaw angle acceleration, that is, a time differential value of the yaw rate) are generated in the host vehicle. In a case where the lateral acceleration and the yaw rate change rate become excessively large, the driver feels that the behavior of the host vehicle is not smooth and is unnatural.

Accordingly, the driving assistance ECU 10 acquires a lateral acceleration Gy and a yaw rate change rate dYR with the driving state parameter acquisition unit 10C. The lateral acceleration Gy is acquired based on a signal from the lateral acceleration sensor 20. The yaw rate change rate dYR is acquired by calculating a change amount per predetermined time of the yaw rate YRt acquired based on a signal of the yaw rate sensor 18. Both of the lateral acceleration Gy and the yaw rate change rate dYR are driving state parameters of the host vehicle that change according to at least one of the steering angle and a temporal change rate of the steering angle.

The driving assistance ECU 10 sets an upper limit value (control allowable limit value) for each of the magnitude |Gy| of the lateral acceleration Gy and the magnitude |dYR| of the yaw rate change rate dYR. In other words, in the lane keeping assistance control, a maximum lateral acceleration Gymax that is a maximum value of the magnitude (absolute value) of the lateral acceleration allowed to be generated is set, and a maximum yaw rate change rate dYRmax that is a maximum value of the magnitude of the yaw rate change rate allowed to be generated is set. Accordingly, next, the driving assistance ECU 10 limits the target steering torque Tr* with the control execution unit 10D such that the magnitude |Gy| of the actual lateral acceleration Gy does not exceed the maximum lateral acceleration Gymax, and such that the magnitude |dYR| of the actual yaw rate change rate dYR does not exceed the maximum yaw rate change rate dYRmax. The above is the outline of the lane keeping assistance control.

Deviation Prediction Determination and Warning Processing

Figure 4:
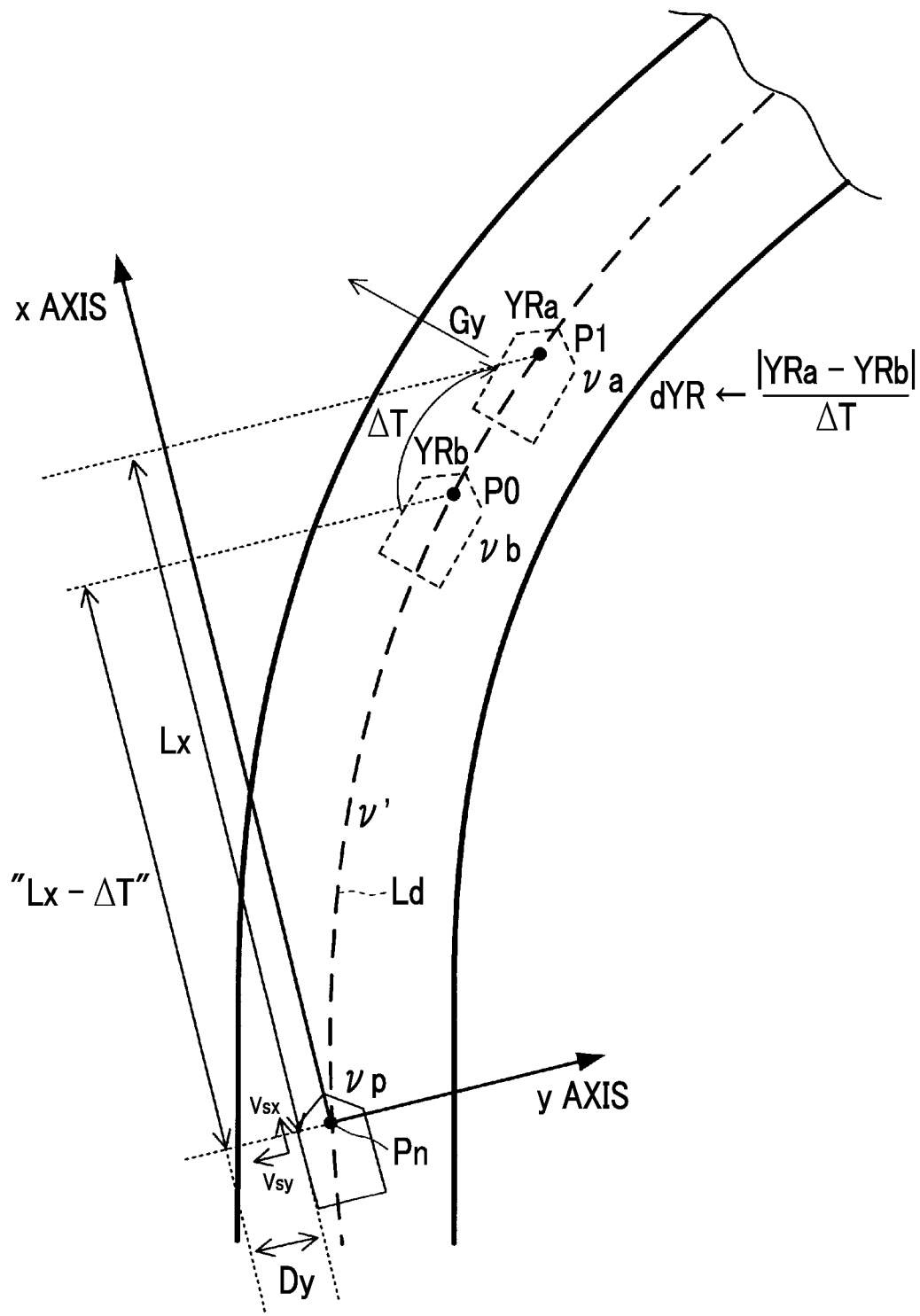
FIG. 4 is a plan view illustrating operation of the driving assistance device according to the embodiment of the present disclosure.

Next, deviation prediction determination and processing of a warning that are performed by the driving assistance ECU 10 with the determination unit (warning controller) 10E will be described. The driving assistance ECU 10 estimates (acquires) a curvature of a position P1 in front of and far from the host vehicle in the traveling lane in a case where the lane keeping assistance control is executed. Specifically, the driving assistance ECU 10 estimates a curvature va of the position P1 on the target traveling line Ld at a longitudinal distance Lx from a current position Pn of the host vehicle during traveling shown in FIG. 4. The longitudinal distance Lx is a distance along the central axis of the host vehicle.

Specifically, the driving assistance ECU 10 calculates the curvature va of the target traveling line Ld at the position P1 based on the target traveling line Ld at the longitudinal distance Lx forward of the host vehicle.

It is desirable that the longitudinal distance Lx is set to a distance at which the driver can perform an avoidance operation (for example, a driving operation to decelerate the vehicle) to change a traveling state of the host vehicle in advance such that the host vehicle can avoid deviation from the traveling lane even though "the lateral acceleration having an absolute value greater than the maximum lateral acceleration Gymax and/or the yaw rate change rate dYR having an absolute value greater than the maximum yaw rate change rate dYRmax" are not generated. The longitudinal distance Lx is set in advance by an experiment, a simulation, or the like. The longitudinal distance Lx may be a fixed value or may be a variable value calculated using Expression (4) described below.

$$Lx = Vsx \times (T1 + Td) \quad (4)$$

Here, Vsx is a current vehicle speed. T1 is the above-described preview time (for example, T1=0.7 seconds). Td is a reaction delay time until the driver starts the avoidance operation after a warning described below is issued (for example, Td=1 second).

The driving assistance ECU 10 calculates a steering angle θa of the host vehicle needed for making the host vehicle travel at the current vehicle speed Vsx along the lane having the estimated curvature va by a method described below. The driving assistance ECU 10 calculates "a lateral acceleration Gys and a yaw rate change rate dYRs", which are generated in a case where it is assumed that the host vehicle travels at the current vehicle speed Vsx along the lane having the curvature va, based on the calculated steering angle θa and the current vehicle speed Vsx by a method described below.

In addition, the driving assistance ECU 10 determines whether or not the calculated "lateral acceleration Gys and yaw rate change rate dYRs" exceed the upper limit values (control allowable limit values) of the lane keeping assistance control. That is, the driving assistance ECU 10 determines whether or not the lane keeping assistance control exceeds a control allowable limit. Specifically, the driving assistance ECU 10 determines whether or not the magnitude |Gys| of the calculated lateral acceleration Gys and the magnitude |dYRs| of the calculated yaw rate change rate dYRs exceed the maximum lateral acceleration Gymax and the maximum yaw rate change rate dYRmax, respectively.

In at least one of a case where determination is made that the magnitude |Gys| of the lateral acceleration Gys is greater than the maximum lateral acceleration Gymax and a case where determination is made that the magnitude |dYRs| of the yaw rate change rate dYRs is greater than the maximum yaw rate change rate dYRmax, the driving assistance ECU 10 determines that there is a possibility that the lane keeping assistance control may reach the control allowable limit (there is a possibility of lane deviation).

In a case where lane keeping assistance control exceeds the control allowable limit when the host vehicle actually reaches the position P1, the host vehicle cannot travel along the target traveling line Ld at the position P1 through the lane keeping assistance control. In other words, in a case where control so as to exceed the control allowable limit of the lane keeping assistance control is not performed at the position P1, there is a high possibility that the host vehicle may deviate from the traveling lane after the position P1. The control so as to exceed the control allowable limit of the lane keeping assistance control is referred to as, for example, lane deviation avoidance control (LDA), and is control for allowing the generation of a lateral acceleration having magnitude exceeding the maximum lateral acceleration Gymax and/or a yaw rate change rate having magnitude exceeding the maximum yaw rate change rate dYRmax.

Accordingly, when the host vehicle is traveling at the current position Pn, in a case where determination is made that there is a possibility that the lane keeping assistance control may reach the control allowable limit as described above, a warning for informing to this effect is issued, whereby the driver is expected to be requested for any driving operation.

Meanwhile, in a case where the camera sensor 16*b* cannot sufficiently recognize the white lines near the position P1 since the white lines are thinned near the position P1 or weather is extremely bad, the accuracy of the target traveling line Ld itself at the position P1 is not satisfactory. As a result, a case where the curvature va at the position P1 is not accurate occurs. Furthermore, as described below, in a case where the traveling lane has no white lines and the target traveling line Ld is set based on a traveling trajectory of the following target vehicle that the host vehicle follows, there is a possibility that the curvature va at the position P1 may not be accurate. In addition, since the curvature of a road included in the map information stored in the map database 82 is often an average (representative) curvature of the road in a certain area, even in a case where the driving assistance ECU 10 estimates the curvature va at the position P1 based on the map information stored in the map database 82, the accuracy of the curvature va is not high.

Accordingly, when the host vehicle is traveling at the current position Pn, in a case where determination is made that there is a possibility that the lane keeping assistance control may reach the control allowable limit when the host vehicle reaches the position P1 (hereinafter, this case may be expressed as "a case where a first condition is satisfied"), in a case where a warning for informing to this effect is issued immediately, there is a possibility that the warning may be an erroneous warning. As a result, the driver may feel troublesomeness with such a warning.

Accordingly, in a case where determination is made that the first condition is satisfied (that is, in a case where determination is made that there is a possibility that the lane keeping assistance control may reach the control allowable limit), the driving assistance ECU 10 issues a warning when a second condition described below is satisfied, without issuing a warning immediately.

Second Condition

"The position of the deviation-side traveling lane edge" at the current position Pn can be specified based on the position of one of the right and left white lines of the host vehicle at the current position Pn, and the behavior (hereinafter, referred to as a "deviation behavior") of the host vehicle approaching the deviation-side traveling lane edge occurs. The position of the deviation-side traveling lane edge is the position of the white line, on the side on which the host vehicle deviates, with respect to the host vehicle at the current position Pn in a case where the lane keeping assistance control is continued within the control allowable limit at a point (that is, the position P1) where determination is made that there is a possibility that the lane keeping assistance control may reach the control allowable limit. The position of the white line with respect to the host vehicle is the distance between the front end central position of the host vehicle and the white line.

A case where the position of the deviation-side traveling lane edge can be specified based on the position of one of the right and left white lines of the host vehicle at the current position Pn includes the following cases.

A case where the white lines of the deviation-side traveling lane edge at the current position Pn are recognized clearly (with reliability equal to or greater than a predetermined value) by the camera sensor 16*b*.

A case where the white line on an opposite side to the deviation-side traveling lane edge at the current position Pn is recognized clearly (with reliability equal to or greater than a predetermined value) by the camera sensor 16*b*, the right and left white lines are recognized clearly (with reliability equal to or greater than a predetermined value) by the camera sensor 16*b* until the host vehicle reaches the current position Pn, the driving assistance ECU 10 calculates and stores a traveling lane width based on the right and left white lines, and the position of the white line of the deviation-side traveling lane edge at the current position Pn can be estimated based on the white line on an opposite side to the deviation-side traveling lane edge clearly recognizable at the current position Pn and the stored traveling lane width.

Since determination is made whether or not the deviation behavior occurs based on the position of the deviation-side traveling lane edge specified at the current position Pn, a probability of determination about whether or not the deviation behavior occurs is high. Accordingly, in a case where determination is made that the deviation behavior occurs, the estimated "curvature va at the position P1" is close to a true value, and for this reason, "a probability of determination that there is a possibility that the lane keeping assistance control may reach the control allowable limit when the host vehicle reaches the position P1" increases. Accordingly, in a case where a warning is issued when both of the first condition and the second condition are satisfied, it is possible to reduce a possibility that an erroneous warning may be issued compared to a case where a warning is issued when solely the first condition is satisfied.

Specifically, the driving assistance ECU 10 determines that the deviation behavior in a case where the following conditions A and B are satisfied. Hereinafter, a deviation-side distance Dy is the distance between the deviation-side traveling lane edge and the host vehicle. Specifically, the deviation-side distance Dy is the distance between a side end portion of the host vehicle close to the deviation-side traveling lane edge and the deviation-side traveling lane. A deviation-side traveling lane edge approach speed Vsy is a speed at which the host vehicle approaches the deviation-side traveling lane edge. That is, the deviation-side traveling lane edge approach speed Vsy is a speed (lateral speed) at which the host vehicle approaches the deviation-side traveling lane in the vehicle width direction. Accordingly, it may be said that the deviation-side traveling lane edge approach speed Vsy is a speed that is a time differential value of the deviation-side distance Dy and becomes a positive value when the deviation-side distance Dy becomes small with the lapse of time.

Condition A

The deviation-side distance Dy is equal to or less than a predetermined distance Dyth.

Condition B

The deviation-side traveling lane edge approach speed Vsy of the host vehicle is equal to or higher than a threshold lateral speed Vsyth.

The driving assistance ECU 10 may be configured to determine that the deviation behavior occurs when the following condition C is satisfied.

Condition C

A time (hereinafter, referred to as a "deviation estimation time") Tdp until the side end portion of the host vehicle close to the deviation-side traveling lane edge reaches the deviation-side traveling lane edge is equal to or less than a threshold time Tdpth.

The deviation estimation time Tdp is calculated by dividing the deviation-side distance Dy by the deviation-side traveling lane edge approach speed Vsy.

Alternatively, the driving assistance ECU 10 may be configured to determine that the deviation behavior occurs when determination is made that one of a case where both of the condition A and condition B are satisfied and a case where the condition C is satisfied is satisfied.

In this way, in a case where determination is made that there is a possibility that the control limit of the lane keeping assistance control may be exceeded, and determination is made that the "deviation behavior" occurs (that is, when determination is made that both of the first condition and the second condition are satisfied), the driving assistance ECU 10 issues a warning. Accordingly, it is possible to extremely reduce a possibility that an erroneous warning may be issued.

Specific Operation

Next, specific operation of the CPU (simply referred to as a "CPU") of the driving assistance ECU 10 will be described. The CPU executes a routine shown in a flowchart of FIG. 5 each time a predetermined time elapses.

Figure 5:
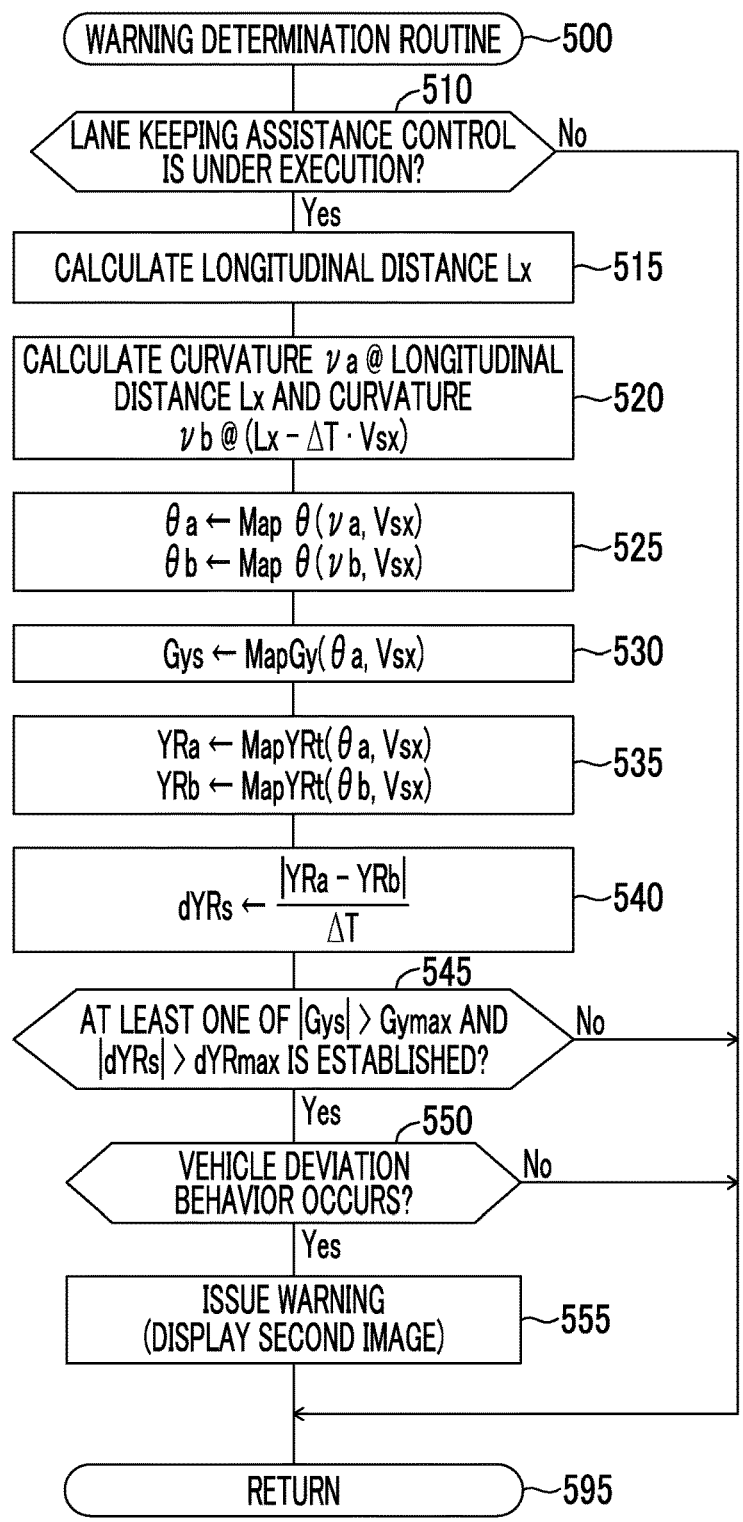
FIG. 5 is a flowchart showing a warning execution routine that is executed by a CPU of a driving assistance ECU shown in FIG. 1.

Accordingly, in a case where a predetermined timing is reached, the CPU starts the routine of FIG. 5 from Step 500, progresses to Step 510, and determines whether or not the lane keeping assistance control is under execution. As described above, the lane keeping assistance control is executed solely during the execution of the adaptive cruise control. In a case where the lane keeping assistance control is not under execution, the CPU determines to be "No" in Step 510, progresses directly to Step 595, and ends the routine once.

In a case where the lane keeping assistance control is under execution, the CPU determines to be "Yes" in Step 510, performs processing of Steps 515 to 540 described below in order, and progresses to Step 545. When the lane keeping assistance control is under execution, the adaptive cruise control is also under execution. Accordingly, the CPU displays a first image shown in FIG. 6A on the display 72 as an image indicating that both kinds of control are under execution. The first image is an image corresponding to a case where the right and left white lines of the host vehicle can be specified.

Figure 6A:
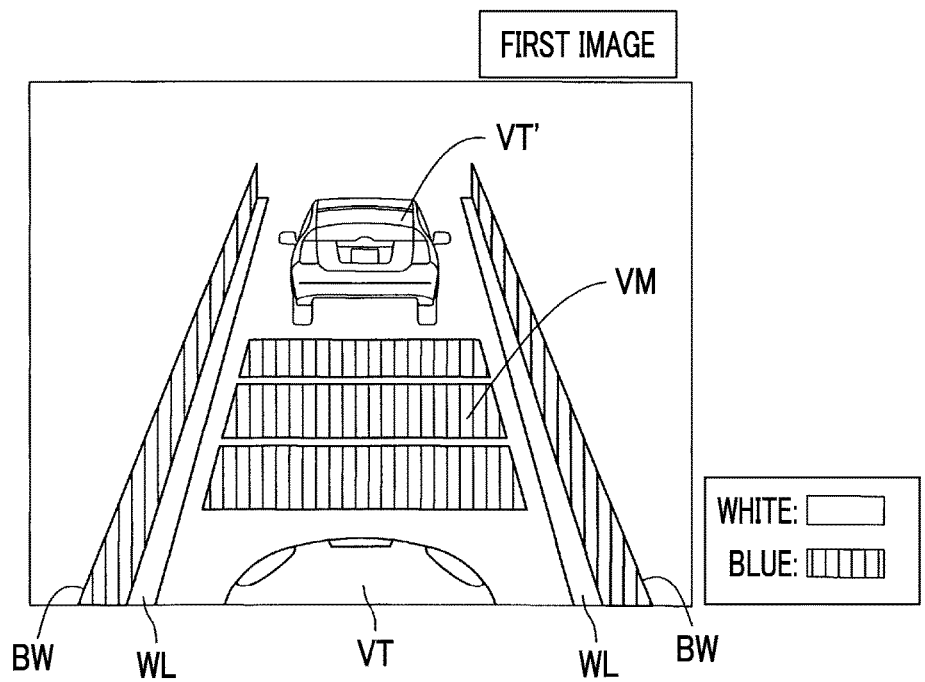
FIG. 6A shows a first image that is displayed on a display shown in FIG. 1.

In the first image shown in FIG. 6A, a front end portion VT of the host vehicle is shown near a lower end of a central portion of the first image, two white lines WL are shown on both of the right and left sides of the front end portion VT of the host vehicle, and a blue wall BW is shown outside each white line HS. That is, the first image is an image including plotting elements (WL) modeled after a pair of right and left white lines and plotting elements modeled after erect wall portions (BW) erected from the white lines. A barometer VM representing the inter-vehicle distance between the following target vehicle and the host vehicle is shown in an area above the front end portion VT, and the following target vehicle and a rear portion VT' are shown on above the barometer VM.

Step 515: The CPU calculates the longitudinal distance Lx from the current position Pn of the host vehicle to the position P1, at which the shape of the traveling lane is estimated, according to Expression (4) described above.

Step 520: The CPU reads the target traveling line Ld separately acquired, and calculates the curvature va of the position P1 on the target traveling line Ld at the longitudinal distance Lx from the current position Pn and a curvature vb of a position P0 on the target traveling line Ld at a longitudinal distance $|Lx-\Delta T \cdot Vsx|$ from the current position Pn. It should be noted that $\Delta T$ is a minute time.

Step 525: The CPU applies the curvature va and the current vehicle speed Vsx to a look-up table (map) Mapθ(v,Vs) to calculate the steering angle θa needed for making the host vehicle travel at the vehicle speed Vsx along a lane having the curvature va. In addition, the CPU applies the curvature vb and the current vehicle speed Vsx to the look-up table Mapθ(v,Vs) to calculate a steering angle θb for making the host vehicle travel at the vehicle speed Vsx along a lane having the curvature vb. It should be noted that Mapθ(v,Vs) is a look-up table prescribed by an experiment. In addition, the CPU may calculate the steering angle θa and the steering angle θb using a known expression that is satisfied among the steering angle θ, the curvature v, and the vehicle speed Vs.

Step 530: The CPU applies the steering angle θa and the vehicle speed Vsx to a look-up table MapGy(θ,Vs) to calculate the lateral acceleration Gys that is generated when the host vehicle travels at the vehicle speed Vsx while maintaining the steering angle θa of the host vehicle. In other words, the CPU calculates the lateral acceleration Gys that is generated in a case where the host vehicle travels at the vehicle speed Vsx along the lane having the curvature va. The CPU may calculate the lateral acceleration Gys using a known expression that is satisfied among the steering angle θ, the vehicle speed Vs, and the lateral acceleration Gy.

Step 535: The CPU applies the steering angle θa and the vehicle speed Vsx to a look-up table MapYRt(θ,Vs) to calculate a yaw rate YRa that is generated in a case where the host vehicle travels at the vehicle speed Vsx while maintaining the steering angle θa of the host vehicle. Similarly, the CPU applies the steering angle θb and the vehicle speed Vsx to the look-up table MapYRt(θ,Vs) to calculate a yaw rate YRb that is generated in a case where the host vehicle travels at the vehicle speed Vsx while maintaining the steering angle θb of the host vehicle. The CPU may calculate the yaw rate YRa and the yaw rate YRb using a known expression that is satisfied among the steering angle θ, the vehicle speed Vs, and the yaw rate YRt.

Step 540: The CPU calculates the yaw rate change rate dYRs, which is generated in a case where the host vehicle travels at the vehicle speed Vsx while maintaining the steering angle θa of the host vehicle, according to Expression (5) described below. In other words, the CPU calculates the yaw rate change rate dYRs that is generated in a case where the host vehicle travels at the vehicle speed Vsx along the lane having the curvature va.

$$dYRs = |YRa - YRb|/\Delta T \quad (5)$$

Next, the CPU progresses to Step 545 and determines whether or not at least one of the following two conditions is satisfied. That is, in Step 545, the CPU determines whether or not there is a possibility that the lane keeping assistance control may reach the control allowable limit (there is a possibility of lane deviation), in other words, whether or not the first condition is satisfied.

The magnitude |Gys| of the lateral acceleration Gys is greater than the maximum lateral acceleration (threshold lateral acceleration) Gymax.

The magnitude |dYRs| of the yaw rate change rate dYRs is greater than the maximum yaw rate change rate (threshold yaw rate change rate) dYRmax.

In a case where the magnitude |Gys| of the lateral acceleration Gys is equal to or less than the maximum lateral acceleration Gymax and the magnitude |dYRs| of the yaw rate change rate dYRs is equal to or less than the maximum yaw rate change rate dYRmax (that is, in a case where the first condition is not satisfied), the CPU determines to be "No" in Step 545, progresses directly to Step 595, and ends the routine once. That is, in this case, since determination can be made that there is no possibility that the lane keeping assistance control may reach the control allowable limit when the host vehicle reaches the position P1, the CPU does not issue a warning.

In contrast, in a case where at least one of the magnitude |Gys| of the lateral acceleration Gys being greater than the maximum lateral acceleration Gymax and the magnitude |dYRs| of the yaw rate change rate dYRs being greater than the maximum yaw rate change rate dYRmax is satisfied (that is, in a case where the first condition is satisfied), the CPU determines to be "Yes" in Step 545 and progresses to Step 550.

In Step 550, the CPU determines whether or not the above-described deviation behavior occurs. That is, in Step 550, the CPU determines whether or not both of the condition A (Dy≤Dyth) and the condition B (Vsy≥Vsyth) are satisfied. In a case where at least one of the condition A and the condition B is not satisfied, the CPU determines to be "No" in Step 550, progresses to Step 595, and ends the routine once. That is, in this case, since determination can be made that the deviation behavior does not occur, and accordingly, determination can be made that there is no possibility or an extremely low possibility that lane keeping assistance control may reach the control allowable limit when the host vehicle reaches the position P1, the CPU does not issue a warning.

In contrast, in a case where both of the condition A (Dy≤Dyth) and the condition B (Vsy≥Vsyth) are satisfied, determination can be made that the deviation behavior occurs, and accordingly, determination can be made that there is a possibility or an extremely high possibility that the lane keeping assistance control may reach the control allowable limit when the host vehicle reaches the position P1.

Accordingly, in this case, the CPU determines to be "Yes" in Step 550, progresses to Step 555, and issues a warning. Specifically, in Step 550, the CPU gives a command to the display ECU 70 to issue a warning using the buzzer 71 and the display 72. With this, the CPU informs the driver to the effect that there is a possibility that the lane keeping assistance control may reach the control allowable limit, and as a result, the host vehicle deviates from the traveling lane. Specifically, the CPU makes the buzzer 71 sound and makes the display 72 display a second image for issuing a warning shown in FIG. 6B. Thereafter, the CPU progresses to Step 595 and ends the routine once.

Figure 6B:
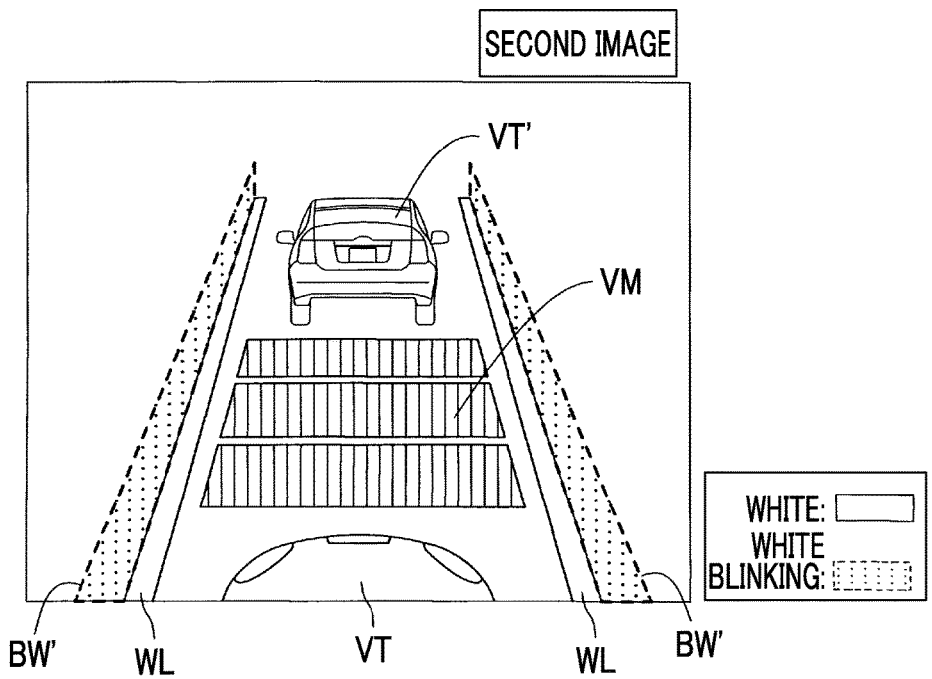
FIG. 6B shows a second image that is displayed on the display shown in FIG. 1.

The second image shown in FIG. 6B is different from the first image shown in FIG. 6A solely in that the blue wall BW is replaced with a white and blinking wall BW". With this, visual appeal is made for the driver to the effect that there is a possibility that the lane keeping assistance control may reach the control allowable limit (there is a possibility of lane deviation), whereby it is possible to alert the driver. The second image may be an image in which at least one of a color, a shape, and a lighting state of the erect wall portions is changed from the first image.

As described above, the present device determines that there is a possibility that the lane keeping assistance control may reach the control allowable limit (there is a possibility of lane deviation) when not only the first condition but also the second condition are satisfied, and issues a warning for informing the driver to this effect. Therefore, it is possible to extremely reduce a possibility that an erroneous warning may be issued.

Modification Example

The present disclosure is not limited to the above-described embodiment, and various modification examples can be employed within the scope of the present disclosure. For example, in the present device, as described above, the curvature va of the position P1 of the traveling lane in front of and far from the host vehicle (and the curvature vb of the position P0 slightly ahead of the position P1) may be acquired by various methods.

For example, in a case where the right and left white lines of the host vehicle cannot be recognized, the present device can determine the target traveling line Ld using a traveling trajectory of the following target vehicle. In this case, the present device may calculate and acquire the curvature va using Expression (6) described below.

Curvature $va$=curvature $vp$+(curvature change rate $v'$ of target traveling line $Ld$×longitudinal distance $Lx$)  (6)

In Expression (6), the curvature vp is the curvature of the target traveling line Ld obtained by the traveling trajectory of the following target vehicle in a case where the host vehicle is at the current position Pn. In addition, the curvature change rate v' of the target traveling line Ld obtained by the traveling trajectory of the following target vehicle is a change amount of the curvature v of the target traveling line Ld per unit longitudinal distance.

Meanwhile, it is known that the traveling trajectory of the following target vehicle is accurately approximated with a cubic function indicated by Expression (7) described below.

$Ly = a \cdot Lx^3 + b \cdot Lx^2 + c \cdot Lx + d$  (7)

Then, the coefficient a is ⅙ of the curvature change rate v' (that is, v'=6·a), and the coefficient b is ½ of the curvature vp (that is, vp=2·b). Furthermore, the coefficients a and b can be obtained by inputting time-series data of a longitudinal distance x(t) of a point of the traveling trajectory of the following target vehicle along the central axis of the host vehicle, a lateral distance y(t) of the point on the traveling trajectory of the following target vehicle in a direction orthogonal to the central axis of the host vehicle, a yaw rate Yrt(t) of the host vehicle, and a vehicle speed Vsx(t) of the host vehicle to a Kalman filter.

The present device executes the lane keeping assistance control solely during the execution of the adaptive cruise control; however, the present device may be configured to execute the lane keeping assistance control even though the adaptive cruise control is not under execution. In addition, the design of the images (FIGS. 6A and 6B) displayed by the processing of Step 555 may be changed as appropriate.

The present device is configured to issue a warning in a case where determination is made that the "deviation behavior" occurs at the same point of time (that is, the present point of time) when determination is made that there is a possibility that the control limit of the lane keeping assistance control may be exceeded (that is, when the first condition is satisfied) (that is, when determination is made that the second condition is satisfied). However, the present device may be configured to issue a warning in a case where the second condition is satisfied at a third point of time in a period from a point of time at which the first condition is satisfied until a second point of time after a predetermined time elapses. In this case, a predetermined specification time may be a time shorter than a time until the host vehicle is predicted to reach the position P1 (in other words, a time needed when the host vehicle travels for the longitudinal distance Lx obtained by Expression (4), that is, a time (T1+Td)). For example, the specification time is preferably the preview time T1.

The present device may set the point of the position P1 to a point advanced by a predetermined distance from the current position Pn of the host vehicle along the target traveling line Ld.

In the driving assistance device according to the aspect of the present disclosure, the electronic control unit may be configured to acquire a lateral acceleration of the host vehicle as the driving state parameter, control the steering angle such that the magnitude of the acquired lateral acceleration does not exceed a maximum lateral acceleration set as the allowable limit value, estimate, based on a curvature of the target traveling line at the position forward of the host vehicle and a current speed of the host vehicle, a lateral acceleration that is generated when the lane keeping assistance control is executed, determine whether the magnitude of the estimated lateral acceleration exceeds the maximum lateral acceleration, and determine that the first condition is satisfied when the electronic control unit determines that the magnitude of the estimated lateral acceleration exceeds the maximum lateral acceleration.

According to the aspect of the present disclosure, control is performed such that the lateral acceleration of the host vehicle does not exceed the maximum lateral acceleration during the lane keeping assistance control, and in a case where the lateral acceleration of the host vehicle can be predicted to exceed the maximum lateral acceleration, a warning can be issued.

In the driving assistance device according to the aspect of the present disclosure, the electronic control unit may be configured to acquire a yaw rate change rate of the host vehicle as the driving state parameter, control the steering angle such that the magnitude of the acquired yaw rate change rate does not exceed a maximum yaw rate change rate set as the allowable limit value, estimate, based on a curvature of the target traveling line at the position forward of the host vehicle and a current speed of the host vehicle, a yaw rate change rate that is generated when the lane keeping assistance control is executed, determine whether the magnitude of the estimated yaw rate change rate exceeds the maximum yaw rate change rate, and determine that the first condition is satisfied when the electronic control unit determines that the magnitude of the estimated yaw rate change rate exceeds the maximum yaw rate change rate.

According to the aspect of the present disclosure, control is performed such that the yaw rate change rate of the host vehicle does not exceed the maximum yaw rate change rate during the lane keeping assistance control. For this reason, since the yaw rate change rate does not become excessively large during the lane keeping assistance control, it is possible to avoid a sense of discomfort to the driver. In addition, according to the aspect of the present disclosure, in a case where the yaw rate change rate of the host vehicle can be predicted to exceed the maximum yaw rate change rate, a warning can be issued.

In the driving assistance device according to the aspect of the present disclosure, the electronic control unit may be configured to determine that the second condition is satisfied when the electronic control unit determines that the distance between the deviation-side traveling lane edge and the host vehicle at the current position of the host vehicle is within a predetermined distance and an approach speed that is a speed of the host vehicle moving toward the deviation-side traveling lane edge is equal to or higher than a threshold lateral speed (Step 550: Yes).

In the driving assistance device according to the aspect of the present disclosure, the electronic control unit may be configured to determine that the second condition is satisfied when the electronic control unit determines that a deviation estimation time obtained dividing the distance between the deviation-side traveling lane edge and the host vehicle at the current position of the host vehicle by an approach speed that is a speed of the host vehicle moving toward the deviation-side traveling lane edge is equal to or less than a predetermined threshold time.

According to the aspect of the present disclosure, determination can be made whether or not the second condition is satisfied (whether or not the deviation behavior occurs) based on the distance between the deviation-side traveling lane edge that can be accurately ascertained because of being close to the current position of the host vehicle, and the host vehicle. Thus, it is possible to more accurately determine whether or not the second condition is satisfied, and therefore, it is possible to extremely reduce a possibility that an erroneous warning may be issued.

In the driving assistance device according to the aspect of the present disclosure, the warning unit may include a display unit configured to display an image to the driver of the host vehicle, and the electronic control unit may be configured to make the display unit display a first image indicating that the lane keeping assistance control is executed during the execution of the lane keeping assistance control, and make the display unit display a second image for a warning instead of the first image to issue the warning when determination is made that both of the first condition and the second condition are satisfied.

According to the aspect of the present disclosure, the driver who recognizes the execution of the lane keeping assistance control with the first image recognizes the second image, thereby intuitively ascertain that there is a possibility that the lane keeping assistance control may reach the control allowable limit (there is a possibility of lane deviation).

In the driving assistance device according to the aspect of the present disclosure, the display unit may be configured to display, as the first image, an image including plotting elements modeled after a pair of lane division lines and erect wall portions respectively erected from the lane division lines, and display, as the second image, an image with a color, a shape, and a lighting state of the erect wall portions changed from the first image.

According to the aspect of the present disclosure, when determination is made that there is a possibility that the lane keeping assistance control may reach the control allowable limit (there is a possibility of lane deviation) in a case where the lane keeping assistance control is under execution, since a display form of the wall portion being displayed is changed, the driver can more intuitively ascertain that there is a possibility that the lane keeping assistance control may reach the control allowable limit.

What is claimed is:

1. A driving assistance device comprising:
   a warning unit configured to issue a warning to a driver of a host vehicle; and
   an electronic control unit configured to
      acquire information in front of the host vehicle relating to a traveling lane, on which the host vehicle is traveling,
      determine a target traveling line based on the acquired information,
      acquire a driving state parameter of the host vehicle that changes according to at least one of a steering angle and a temporal change rate of the steering angle,
      execute lane keeping assistance control for changing the steering angle of the host vehicle such that the host vehicle travels along the target traveling line, and
      make the warning unit issue the warning,
   wherein the electronic control unit is configured to
      control the steering angle such that a magnitude of the driving state parameter that occurs through the lane keeping assistance control does not exceed a predetermined allowable limit value, and
      make the warning unit issue the warning in a case where the electronic control unit determines that a first condition is satisfied when the electronic control unit determines that a second condition is satisfied, the first condition being a condition that there is a possibility that the host vehicle deviates from a deviation-side traveling lane edge specified by one of right and left lane division lines defining the traveling lane due to the magnitude of the driving state parameter exceeding the allowable limit value when the lane keeping assistance control is executed along the target traveling line at a position of a predetermined distance forward from a current position of the host vehicle, the second condition being a condition that behavior of the host vehicle approaching the deviation-side traveling lane edge occurs at the current position of the host vehicle, at at least one point of time of a first point of time at which determination is made that the first condition is satisfied and a third point of time in a period from the first point of time to a second point of time after a predetermined time elapses.

2. The driving assistance device according to claim 1, wherein the electronic control unit is configured to
   acquire a lateral acceleration of the host vehicle as the driving state parameter,
   control the steering angle such that a magnitude of the acquired lateral acceleration does not exceed a maximum lateral acceleration set as the allowable limit value,
   estimate, based on a curvature of the target traveling line at the position forward of the host vehicle and a current speed of the host vehicle, a lateral acceleration that is generated when the lane keeping assistance control is executed,
   determine whether a magnitude of the estimated lateral acceleration exceeds the maximum lateral acceleration, and
   determine that the first condition is satisfied when the electronic control unit determines that the magnitude of the estimated lateral acceleration exceeds the maximum lateral acceleration.

3. The driving assistance device according to claim 1, wherein the electronic control unit is configured to
   acquire a yaw rate change rate of the host vehicle as the driving state parameter,
   control the steering angle such that a magnitude of the acquired yaw rate change rate does not exceed a maximum yaw rate change rate set as the allowable limit value,
   estimate, based on a curvature of the target traveling line at the position forward of the host vehicle and a current speed of the host vehicle, a yaw rate change rate that is generated when the lane keeping assistance control is executed,
   determine whether a magnitude of the estimated yaw rate change rate exceeds the maximum yaw rate change rate, and
   determine that the first condition is satisfied when the electronic control unit determines that the magnitude of the estimated yaw rate change rate exceeds the maximum yaw rate change rate.

4. The driving assistance device according to claim 1, wherein the electronic control unit is configured to determine that the second condition is satisfied when the electronic control unit determines that a distance between the deviation-side traveling lane edge and the host vehicle at the current position of the host vehicle is within a predetermined distance and an approach speed that is a speed of the host vehicle moving toward the deviation-side traveling lane edge is equal to or higher than a threshold lateral speed.

5. The driving assistance device according to claim 1, wherein the electronic control unit is configured to determine that the second condition is satisfied when the electronic control unit determines that a deviation estimation time obtained by dividing a distance between the deviation-side traveling lane edge and the host vehicle at the current position of the host vehicle by an approach speed that is a speed of the host vehicle moving toward the deviation-side traveling lane edge is equal to or less than a predetermined threshold time.

6. The driving assistance device according to claim 1, wherein:
   the warning unit includes a display unit configured to display an image to the driver of the host vehicle; and
   the electronic control unit is configured to
      make the display unit display a first image indicating that the lane keeping assistance control is executed during the execution of the lane keeping assistance control, and
      make the display unit display a second image for a warning instead of the first image to issue the warning when the electronic control unit determines that both of the first condition and the second condition are satisfied.

7. The driving assistance device according to claim 6, wherein the display unit is configured to
   display, as the first image, an image including plotting elements modeled after a pair of lane division lines and erect wall portions respectively erected from the lane division lines, and
   display, as the second image, an image with a color, a shape, and a lighting state of the erect wall portions changed from the first image.

\* \* \* \* \*